United States Patent
Matsuda et al.

(10) Patent No.: US 11,428,449 B2
(45) Date of Patent: Aug. 30, 2022

(54) SEPARATOR AND REFRIGERATION CYCLE APPARATUS

(71) Applicant: Mitsubishi Electric Corporation, Tokyo (JP)

(72) Inventors: Hirofumi Matsuda, Tokyo (JP); Hiroki Ishiyama, Tokyo (JP); Yusuke Shimazu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 134 days.

(21) Appl. No.: 16/770,645

(22) PCT Filed: Dec. 25, 2017

(86) PCT No.: PCT/JP2017/046443
§ 371 (c)(1),
(2) Date: Jun. 8, 2020

(87) PCT Pub. No.: WO2019/130393
PCT Pub. Date: Jul. 4, 2019

(65) Prior Publication Data
US 2021/0172661 A1   Jun. 10, 2021

(51) Int. Cl.
*F25B 43/02* (2006.01)
*F25B 31/00* (2006.01)

(52) U.S. Cl.
CPC ............ *F25B 43/02* (2013.01); *F25B 31/004* (2013.01); *F25B 2400/02* (2013.01)

(58) Field of Classification Search
CPC ........ F25B 43/02; F25B 43/00; F25B 31/004; F25B 2400/02; F25B 2400/23; B01D 17/0217; B01D 45/14
(Continued)

(56) References Cited

U.S. PATENT DOCUMENTS 4,472,949 A * 9/1984 Fujisawa ................. F25B 43/02
62/468
5,495,237 A 2/1996 Yuasa et al.
(Continued)

FOREIGN PATENT DOCUMENTS

CN 107076487 A 8/2017
JP S56-082472 U 7/1981
(Continued)

OTHER PUBLICATIONS

Attached pdf file is translation of foreign reference WO2016063400A1 (Year: 2016).*
(Continued)

*Primary Examiner* — Len Tran
*Assistant Examiner* — Kamran Tavakoldavani
(74) *Attorney, Agent, or Firm* — Posz Law Group, PLC

(57) ABSTRACT

Provided are a separator with improved oil separation efficiency, and a refrigeration cycle apparatus including the separator. The separator includes an inflow pipe portion, an oil storage portion, an oil return pipe portion, and an outflow pipe portion. The inflow pipe portion includes a swirling portion that defines a flow direction of refrigerant so as to swirl the refrigerant. The oil storage portion is connected to the inflow pipe portion. The oil return pipe portion is connected to a vertically lower side of the oil storage portion. The outflow pipe portion includes an opening end that faces the swirling portion. The outflow pipe portion extends from a region that faces the swirling portion to the outside of the oil storage portion. The opening end is configured such that the refrigerant discharged from the swirling portion can directly flow thereinto.

9 Claims, 7 Drawing Sheets

(58) Field of Classification Search
USPC .......................................................... 62/470
See application file for complete search history.

(56) References Cited

U.S. PATENT DOCUMENTS

| | | | | |
|---|---|---|---|---|
| 2006/0196219 A1* | 9/2006 | McGregor | ............ | F25B 43/003 |
| | | | | 62/470 |
| 2013/0312447 A1 | 11/2013 | Inaba et al. | | |
| 2017/0276415 A1* | 9/2017 | Ishiyama | ................ | F25B 43/02 |
| 2018/0361290 A1 | 12/2018 | Suzuki et al. | | |

FOREIGN PATENT DOCUMENTS

| JP | S58-168864 A | | 10/1983 | | |
|---|---|---|---|---|---|
| JP | S62-080473 A | | 4/1987 | | |
| JP | S62-83157 U | | 5/1987 | | |
| JP | H06-174146 A | | 6/1994 | | |
| JP | H09-318203 A | | 12/1997 | | |
| JP | 2009174836 A | * | 8/2009 | .............. | F25B 43/00 |
| JP | 2012181005 A | | 9/2012 | | |
| JP | 2015218982 A | * | 12/2015 | .............. | F25B 43/00 |
| JP | 2016-217158 A | | 12/2016 | | |
| WO | 2016/063400 A1 | | 4/2016 | | |
| WO | WO-2016063400 A1 | * | 4/2016 | ............ | F25B 31/004 |
| WO | 2017/104531 A1 | | 6/2017 | | |

OTHER PUBLICATIONS

Attached pdf file is translation of foreign reference JP2015218982A (Year: 2015).*
Attached pdf file is translation of foreign reference JP2009174836A (Year: 2009).*
International Search Report of the International Searching Authority mailed Mar. 20, 2018 for the corresponding international application No. PCT/JP2017/046443 (and English translation).
Office Action dated May 11, 2021, issued in corresponding JP Patent Application No. 2019-561405 (and English Machine Translation).
The Extended European Search Report dated Dec. 2, 2020 issued in corresponding EP patent application No. 17936884.0.
Office Action dated Apr. 30, 2021, issued in corresponding CN Patent Application No. 201780097834.0 (and English Machine Translation).
Office Action dated Sep. 21, 2021 issued in corresponding JP patent application No. 2019-561405 (and Machine Translation).

* cited by examiner

SEPARATOR AND REFRIGERATION CYCLE APPARATUS

CROSS REFERENCE TO RELATED APPLICATION

This application is a U.S. national stage application of PCT/JP2017/046443 filed on Dec. 25, 2017, the contents of which are incorporated herein by reference.

TECHNICAL FIELD

The present invention relates to a separator that separates oil from refrigerant, and a refrigeration cycle apparatus including the separator.

BACKGROUND ART

A separator that separates oil from refrigerant in a refrigeration cycle apparatus has been conventionally known. As for the separator, it is required to secure the reliability of a compressor in the refrigeration cycle apparatus and to improve the separation efficiency for achieving higher refrigeration cycle performance. Furthermore, a reduction in size of the separator has been recently required. As a small-sized separator, there has been known a method for separating oil from refrigerant by using a swirling portion such as a spiral groove formed in an inner wall of an inflow pipe that supplies gas refrigerant containing oil, or a twisted plate or a swirling vane arranged inside the inflow pipe (refer to, for example, Japanese Patent Laying-Open No. 58-168864). In such separator including the swirling portion, the swirling portion and an oil storage portion are separated, and thus, a reduction in size of the separator can be achieved, as compared with a method for supplying gas refrigerant containing oil from a radial direction of a separator into the separator so as to swirl the gas refrigerant, and capturing the oil on an inner circumferential wall surface of the separator by centrifugal force.

The separator disclosed in Japanese Patent Laying-Open No. 58-168864 mainly includes an inflow pipe having a spiral groove in an inner wall thereof, an oil storage portion connected to the inflow pipe, an outflow pipe having an end located inside the oil storage portion and allowing outflow of gas refrigerant, and an oil return pipe that transfers oil stored in the oil storage portion to a compressor. The gas refrigerant that has flowed into the inflow pipe flows so as to swirl within the inflow pipe along the spiral groove. In the meantime, the oil particles in the gas refrigerant adhere to a surface of the groove. The oil adhering to the surface of the groove is swept into the oil storage portion by a flow of the gas refrigerant. In contrast, the gas refrigerant having the oil particles removed therefrom is discharged outside from the inflow pipe through the inside of the oil storage portion and the outflow pipe.

CITATION LIST

Patent Literature

PTL 1: Japanese Patent Laying-Open No. 58-168864

SUMMARY OF INVENTION

Technical Problem

In the above-described separator, the gas refrigerant that has flowed from the inflow pipe into the oil storage portion is blown onto the oil flowing along the inner wall of the oil storage portion, and thus, the oil may in some cases be re-scattered in the gas refrigerant. When such re-scattered oil is discharged outside through the outflow pipe together with the gas refrigerant, the oil separation efficiency in the separator decreases.

The present invention has been made to solve the above-described problem, and an object of the present invention is to provide a separator with improved oil separation efficiency, and a refrigeration cycle apparatus including the separator.

Solution To Problem

A separator according to the present disclosure is a separator that separates oil from refrigerant containing the oil, the separator including: an inflow pipe portion; an oil storage portion; an oil return pipe portion; and an outflow pipe portion. The refrigerant is introduced into the inflow pipe portion. The inflow pipe portion includes a swirling portion that defines a flow direction of the refrigerant so as to swirl the refrigerant. The oil storage portion is connected to the inflow pipe portion. The oil return pipe portion is connected to a vertically lower side of the oil storage portion. The outflow pipe portion includes an opening end that faces the swirling portion. The outflow pipe portion extends from a region that faces the swirling portion to the outside of the oil storage portion. The opening end is configured such that the refrigerant discharged from the swirling portion can directly flow thereinto.

Advantageous Effects of Invention

According to the foregoing, the refrigerant discharged from the swirling portion directly flows into the opening end of the outflow pipe portion, and thus, it is possible to suppress scattering of the oil in the refrigerant caused by blowing of the refrigerant discharged from the swirling portion onto the oil stored in the oil storage portion. Therefore, it is possible to suppress the occurrence of such a problem that a content of the oil in the refrigerant discharged outside through the outflow pipe portion becomes higher and thus the oil separation efficiency in the separator decreases. As a result, there can be provided a separator with improved oil separation efficiency, and a refrigeration cycle apparatus including the separator.

DESCRIPTION OF EMBODIMENTS

Figure 1:
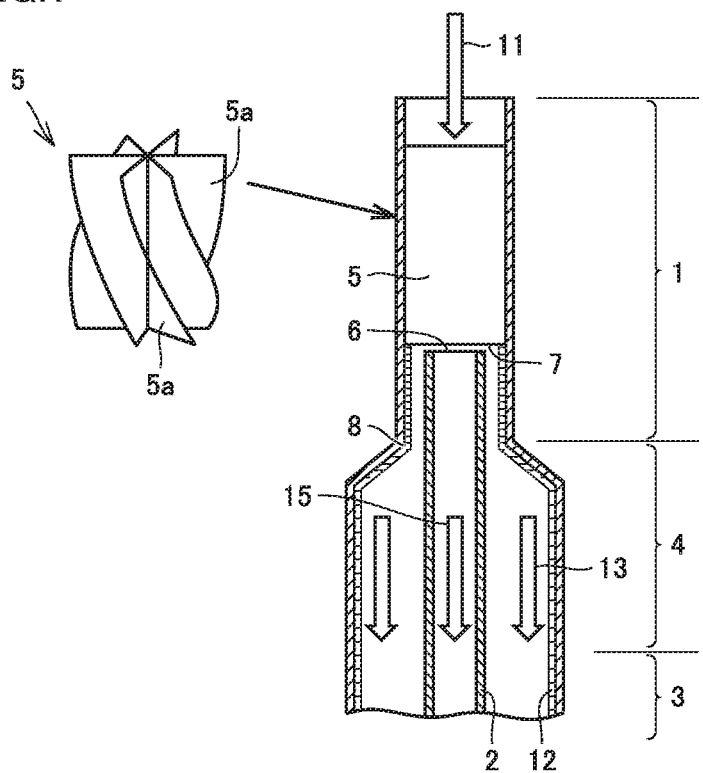
FIG. 1 is a schematic cross-sectional view showing a configuration example of a separator according to a first embodiment of the present invention.

Embodiments of the present invention will be described hereinafter with reference to the figures. In the below-described figures, the same or corresponding portions are denoted by the same reference numerals and description thereof is not repeated. Moreover, in the below-described figures inclusive of FIG. 1, a relation between respective sizes of components may be different from an actual relation therebetween. Further, embodiments of the components described in the entire specification are just exemplary and should not be limited to these descriptions.

First Embodiment

<Configuration of Separator>

Figure 2:
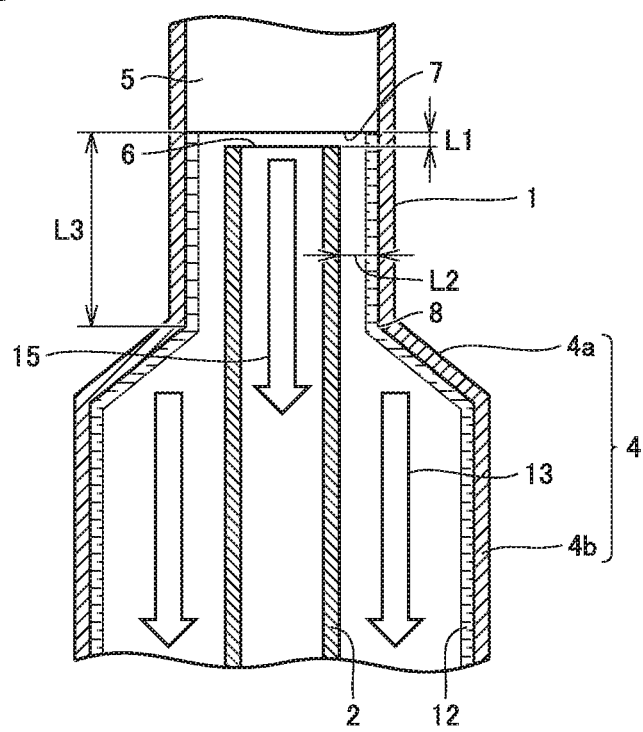
FIG. 2 is a schematic partial cross-sectional view of the separator shown in FIG. 1.
Figure 3:
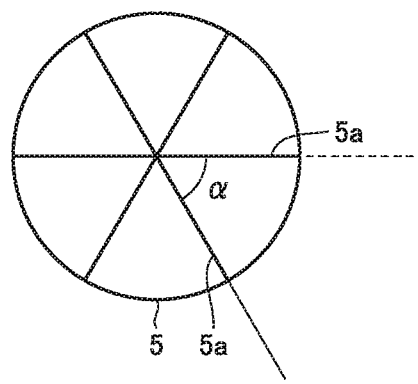
FIG. 3 is a schematic view for illustrating the configuration of the separator shown in FIG. 1.
Figure 4:
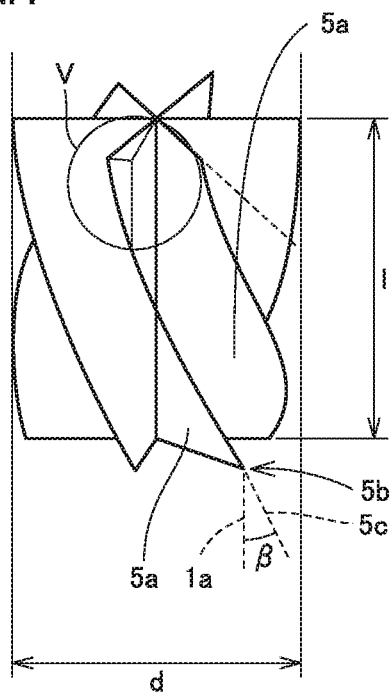
FIG. 4 is a schematic view for illustrating the configuration of the separator shown in FIG. 1.
Figure 5:
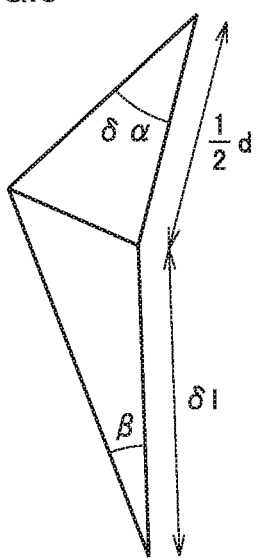
FIG. 5 is a schematic view for illustrating the configuration of the separator shown in FIG. 1.

FIG. 1 is a schematic cross-sectional view showing a configuration example of a separator according to a first embodiment of the present invention. FIG. 2 is a schematic partial cross-sectional view of the separator shown in FIG. 1. FIGS. 3 to 5 are schematic views for illustrating the configuration of the separator shown in FIG. 1. The separator shown in FIGS. 1 to 5 is a separator that separates oil from refrigerant containing the oil. The separator mainly includes an inflow pipe portion 1, an oil storage portion 4, an oil return pipe portion 3, and an outflow pipe portion 2.

The refrigerant is introduced into inflow pipe portion 1 from an upper opening as shown by an arrow 11. Inflow pipe portion 1 includes a swirling portion 5. Swirling portion 5 defines a flow direction of the refrigerant so as to swirl the refrigerant. In swirling portion 5 shown in FIG. 1, a plurality of swirling vanes 5a are arranged to be twisted around a central axis. The number of swirling vanes 5a placed in swirling portion 5 may be one or more, and is six, for example. Inflow pipe portion 1 includes a cylindrical main body portion, and swirling portion 5 placed inside the main body portion.

Oil storage portion 4 is connected to a lower part of inflow pipe portion 1. As shown in FIG. 2, oil storage portion 4 includes a tapered portion 4a and a main body portion 4b. Tapered portion 4a is connected to inflow pipe portion 1. Tapered portion 4a has a width that becomes gradually greater with increasing distance from inflow pipe portion 1. Main body portion 4b is connected to the tapered portion. Main body portion 4b has a tubular shape, e.g., a cylindrical shape.

Oil return pipe portion 3 is connected to a vertically lower side of oil storage portion 4. Oil return pipe portion 3 has a tubular shape. In the separator shown in FIG. 1, oil return pipe portion 3 is connected to and integrated with main body portion 4b of oil storage portion 4.

Outflow pipe portion 2 includes an opening end 6 that faces swirling portion 5. Outflow pipe portion 2 extends from a region that faces swirling portion 5 through oil storage portion 4 to the outside of oil storage portion 4. Opening end 6 is configured such that the refrigerant discharged from swirling portion 5 can directly flow thereinto. Specifically, opening end 6 of outflow pipe portion 2 is arranged adjacent to a lower part 7 that is a refrigerant protruding portion of swirling portion 5. A distance L1 between lower part 7 of swirling portion 5 and opening end 6 is set at a very small value. A method for determining distance L1 will be described below.

In addition, in the separator shown in FIG. 1, opening end 6 is located on the inflow pipe portion 1 side relative to a connection portion 8 that connects inflow pipe portion 1 and oil storage portion 4. That is, when a distance L3 represents a distance from lower part 7 of swirling portion 5 to connection portion 8, outflow pipe portion 2 is arranged to protrude from connection portion 8 toward the inflow pipe portion 1 side by (L3-L1). In addition, a distance L2 between a side wall of outflow pipe portion 2 and an inner wall of inflow pipe portion 1 is set to be, for example, not more than 5 mm, more preferably not more than 3 mm, and further preferably not more than 2 mm From a different perspective, the separator is mainly composed of inflow pipe portion 1, outflow pipe portion 2, oil return pipe portion 3, and oil storage portion 4. Swirling portion 5 that generates a swirling flow by a refrigerant flow toward a refrigerant flow traveling direction is arranged inside inflow pipe portion 1. An end located in a lower part of inflow pipe portion 1 is connected to oil storage portion 4. Outflow pipe portion 2 is connected from a position that faces swirling portion 5 of inflow pipe portion 1 through oil storage portion 4 to an end of oil storage portion 4. Oil return pipe portion 3 is connected to the lower part of oil storage portion 4. Opening end 6, which is an end of outflow pipe portion 2, is located between lower part 7 of swirling portion 5 and connection portion 8 that connects the inflow pipe portion and oil storage portion 4.

Distance L1 between lower part 7 of swirling portion 5 and opening end 6 can be set within the following numerical range:

$$0 < x < \frac{d}{2\tan\beta}. \quad (1)$$

In the above-described equation (1), x represents above-described distance L1. As shown in FIG. 4, $\beta$ represents an angle formed by an extending direction $5c$ at an end $5b$ of swirling vane $5a$ that faces the opening end and an extending direction $1a$ of inflow pipe portion 1. Angle $\beta$ corresponds to a rotation angle at end $5b$ of swirling vane $5a$. In addition, d represents a width of inflow pipe portion 1. A method for deriving the above-described numerical range will be described below.

First, as shown in FIGS. 3 and 4, a rotation angle $\alpha$ in swirling portion 5 is defined as an angle formed by an upstream-side end and a downstream-side end of swirling vane $5a$ when viewed from the upstream side in swirling portion 5.

Next, angle $\beta$ in swirling vane $5a$ is obtained as follows. A side common to the two triangles shown in FIG. 5 is represented by y. In this case, a relation between minute angles δα and δβ is expressed by the following equation (2):

$$y = \frac{1}{2} d \times \delta\alpha = \delta l \times \tan\beta. \quad (2)$$

FIG. 5 is a schematic view showing the relation between minute angles δα and δβ studied in a region indicated by a region V in FIG. 4. In the upper triangle shown in FIG. 5, approximation is performed, assuming that angle δα is very small. The lower triangle in FIG. 5 is studied as a right triangle.

When both sides of the above-described equation (2) are integrated, β can be defined by the equations as described below:

$$\int_0^\alpha \frac{1}{2} d \times \delta\alpha = \int_0^l \delta l \times \tan\beta \quad (3)$$

$$\frac{1}{2} d \int_0^\alpha \times \delta\alpha = \tan\beta \int_0^l \delta l \quad (4)$$

$$\beta = \tan^{-1} \frac{2l\alpha}{d}. \quad (5)$$

Next, angle β at end 5b of swirling portion 5 shown in FIG. 4 is considered. Angle β corresponds to an angle formed by extending direction (tangential direction) 5c of swirling vane 5a at end 5b and extending direction 1a of inflow pipe portion 1 that is a vertical direction. A triangle including an angle corresponding to angle β is considered. When x represents a distance corresponding to distance L1 from swirling portion 5 to opening end 6, and one side of the above-described triangle is a half of a width of an inner circumference (inner circumferential radius) of inflow pipe portion 1, the following equation (6) is satisfied:

$$\frac{d}{2x} = \tan\beta. \quad (6)$$

Distance x obtained from the above-described equation (6) corresponds to a distance between swirling portion 5 and a position at which the refrigerant discharged from the central portion of swirling portion 5 at angle β reaches the inner wall of inflow pipe portion 1. In this way, by setting distance L1 within the numerical range expressed by the above-described equation (1), the gas refrigerant discharged from the central portion of swirling portion 5 can be taken into opening end 6 of outflow pipe portion 2 before the gas refrigerant reaches the inner wall of inflow pipe portion 1.

<Operation of Separator>

As shown in FIG. 1, the gas refrigerant containing oil flows into inflow pipe portion 1 from the upper part of inflow pipe portion 1 as shown by arrow 11. Thereafter, the gas refrigerant flows into swirling portion 5. In swirling portion 5, the gas refrigerant containing oil comes into collision with swirling vane 5a and the inner wall of inflow pipe portion 1, and the oil is thereby captured. The gas refrigerant is guided by swirling vane 5a to form a swirling flow, and transfers the oil captured on a surface of swirling vane 5a to the inner wall side of inflow pipe portion 1. In addition, the captured oil is guided to a wall surface of oil storage portion 4 by the flow of the gas refrigerant. Then, an oil film 12 is formed on an inner wall of oil storage portion 4. Oil film 12 flows to oil return pipe portion 3 as shown by an arrow 13. In contrast, the gas refrigerant having the oil separated therefrom in swirling portion 5 is discharged outside from swirling portion 5 through opening end 6 of outflow pipe portion 2 as shown by an arrow 15.

<Function and Effect>

The above-described separator includes inflow pipe portion 1, oil storage portion 4, oil return pipe portion 3, and outflow pipe portion 2. The refrigerant is introduced into inflow pipe portion 1. Inflow pipe portion 1 includes swirling portion 5 that defines a flow direction of the refrigerant so as to swirl the refrigerant. Oil storage portion 4 is connected to inflow pipe portion 1. Oil return pipe portion 3 is connected to a vertically lower side of oil storage portion 4. Outflow pipe portion 2 includes opening end 6 that faces swirling portion 5. Outflow pipe portion 2 extends from a region that faces swirling portion 5 to the outside of oil storage portion 4. Opening end 6 is configured such that the refrigerant discharged from swirling portion 5 can directly flow thereinto.

With such a configuration, the refrigerant discharged from swirling portion 5 directly flows into opening end 6 of outflow pipe portion 2, and thus, it is possible to suppress scattering of the oil in the refrigerant caused by blowing of the refrigerant discharged from swirling portion 5 onto the oil stored in oil storage portion 4.

Therefore, it is possible to suppress the occurrence of such a problem that a content of the oil in the refrigerant discharged outside through outflow pipe portion 2 becomes higher and thus the oil separation efficiency in the separator decreases.

From a different perspective, the oil film formed on the inner wall of inflow pipe portion 1 as an outer pipe as a result of passage through swirling vane 5a moves to the wall surface side of oil storage portion 4. Furthermore, the oil flows out to oil return pipe portion 3 along the wall surface of oil storage portion 4. In contrast, the gas refrigerant having the oil separated therefrom passes through outflow pipe portion 2 as an inner pipe located in oil storage portion 4, and flows outside the separator. As the position of opening end 6 of outflow pipe portion 2 comes closer to lower part 7 as an end of swirling portion 5, a distance of exposure of the oil film formed on the wall surfaces of inflow pipe portion 1 and oil storage portion 4 to the refrigerant flow becomes shorter. Therefore, the possibility of re-scattering of the oil can be reduced. As a result, a separator with improved oil separation efficiency can be provided.

In the above-described separator, swirling portion 5 includes swirling vane 5a inclined spirally with respect to an extending direction of inflow pipe portion 1. When β represents an angle formed by extending direction 5c at end 5b of swirling vane 5a that faces opening end 6 and extending direction 1a of inflow pipe portion 1, and d represents an inner diameter as a width of inflow pipe portion 1, distance L1 between opening end 6 and swirling portion 5 is less than a value expressed by an equation of d/(2 tan β).

In this case, opening end 6 is arranged on the swirling portion 5 side relative to the position at which the gas refrigerant discharged from the central portion of swirling portion 5 reaches the inner wall of inflow pipe portion 1. Therefore, the gas refrigerant discharged from swirling portion 5 can be taken into opening end 6 of outflow pipe portion 2 before the gas refrigerant reaches the inner wall of inflow pipe portion 1. Therefore, it is possible to suppress the occurrence of such a problem that the gas refrigerant is blown onto the oil film formed on the inner wall of inflow pipe portion 1 and the oil scatters from the oil film.

In the above-described separator, opening end 6 is located on the inflow pipe portion 1 side relative to connection portion 8 that connects inflow pipe portion 1 and oil storage portion 4. In this case, opening end 6, which is a position of outflow pipe portion 2 at which the gas refrigerant is taken in, is arranged on the inflow pipe portion 1 side. Therefore, it is possible to reduce the possibility that the oil scattered from the inner wall of oil storage portion 4 flows into opening end 6.

In the above-described separator, oil storage portion 4 includes: tapered portion 4a; and main body portion 4b. Tapered portion 4a is connected to inflow pipe portion 1 and has a width that becomes gradually greater with increasing distance from inflow pipe portion 1. Main body portion 4b is connected to tapered portion 4a and has a cylindrical shape. In this case, an inner diameter of oil storage portion 4 is increased by tapered portion 4a, and thus, a distance between the inner wall of oil storage portion 4 and opening end 6 of outflow pipe portion 2 can be increased. Therefore, it is possible to reduce the possibility that the oil scattered from the inner wall of oil storage portion 4 flows into opening end 6.

In addition, in the separator configured according to the first embodiment, when x represents a distance indicating an outflow pipe end position, i.e., a distance from swirling portion 5 to opening end 6, distance x may be set within a range from swirling portion 5 to a distance $x_2$ obtained in accordance with the following procedure. That is, above-described distance x may satisfy the condition of $0<x<x_2$. The procedure for deriving distance $x_2$ will be described below.

The refrigerant flow that has passed through swirling vane 5a is a swirling flow. Even after the refrigerant flow passes through swirling vane 5a, the refrigerant flow flows as a swirling flow while having torque, and is attenuated little by little. As to attenuation in an axial direction of the torque in the refrigerant flow, a circumferential momentum equation of the refrigerant flow is expressed by the following equation (7):

$$\frac{dT}{dx} = -2\pi R^2 \tau_{\theta R} = -2\pi R_i^2 \tau_{\theta i}. \tag{7}$$

In the above-described equation (7), $\tau\theta_R$ and $\tau\theta_i$ represent the circumferential shear force on the wall surface and on a liquid film surface, respectively. T represents the torque of the swirling flow. R represents a pipe radius, and Ri represents a radius of a gas phase core portion including droplets.

$\tau\theta_i$ is determined in accordance with the equation (8), based on a friction coefficient $C_{fi}$ of a gas-liquid interface. $\rho_g$ represents a gas phase density, $U_{gRi}$ represents a gas phase velocity toward a radial direction of the gas phase core portion, $U_{lRi}$ represents a liquid film velocity toward the radial direction of the gas phase core portion, $\theta_R$ represents a circumferential angle with respect to the pipe radius, and $\theta_{Ri}$ represents a circumferential angle with respect to the radius of the gas phase core portion including droplets. In addition, $f_1$ represents a value obtained by a velocity distribution meter. Furthermore, $U_{gx}$ represents a gas phase velocity in an X axis direction, and a bar (-) put above $U_{gx}$ means an average velocity. However, $U_{gRi}$ is sufficiently greater than $U_{lRi}$ and R is substantially equal to Ri.

$$\tau_{\theta i} = C_{fi} \frac{\rho_g}{2} (U_{gRi} - U_{fRi})^2 \sin\theta_{Ri} \tag{8}$$

$$\approx C_{fi} \frac{\rho_g}{2} U_{gRi}^2 \sin\theta_{Ri}$$

$$= C_{fi} \frac{\rho_g}{2} \overline{U_{gx}}^2 f_1^2(R_i) \sqrt{\frac{1}{(1+\tan^2\theta_{Ri}^2)}} \tan\theta_{Ri}$$

Torque T of a gas flow portion of an annular dispersed flow can be expressed like the equation (9):

$$T_c = \left(\frac{\pi}{2}\right) \rho_g \overline{U_{gx}}^2 R^3 \tan\theta_R H_3. \tag{9}$$

In the above-described equation (9), $H_3$ represents a correction factor for maintaining consistency with an experimental result. When the equation (8) and the equation (9) are substituted into the equation (7), the equation (10) is obtained:

$$\frac{dT}{dx} = \frac{-4C_{fi}}{d} \left\{ f_1^2(R_i) \sqrt{\frac{1}{(1+\tan^2\theta_{Ri}^2)}} \tan\theta_{Ri}/H_3 \right\} T. \tag{10}$$

In the above-described equation (10), D represents a diameter of the pipe and is identical to inner diameter d as a width of inflow pipe portion 1. A value in the braces in the above-described equation (10) varies with a change in the axial direction of $f_1^2(R_i)$ and $H_3$, which are values based on a swirling angle and a velocity distribution. However, it is known from an experiment that the value is approximately not less than 1 and not more than 1.3. Therefore, approximation is performed, assuming that the value in the braces is a constant value k. As a result, the equation (11) is obtained:

$$\frac{dT}{dx} = \frac{-4C_{fi}}{d} kT. \tag{11}$$

When the equation (11) is integrated under the initial condition of $T=T_0$ when $x=0$, the equation (12) is obtained. $T_0$ represents the torque of the swirling flow at an outlet of the swirling vane.

$$T(x_2) = T_0 \exp\left(\frac{-4C_{fi}}{d} k x_2\right) \tag{12}$$

$T(x_2)$ in the equation (12) represents the torque of the swirling flow at position $x_2$. It is known from Wallis, et al. that friction coefficient $C_{fi}$ of the gas-liquid interface is expressed by the equation (13):

$$C_{fi} = 0.005\left\{1 + 300\left(\frac{h}{d}\right)\right\}. \tag{13}$$

In the above-described equation (13), h represents an average thickness of the liquid film. Based on the above-described equations (12) and (13), a value of torque of the two-phase flow along a longitudinal direction of the pipe can be obtained. As can be seen in the above-described equations, the swirling flow that has left the swirling vane decreases exponentially as a function of distance $x_2$. Based on this finding, distance x indicating the outflow pipe end position is determined from a torque attenuation rate from the outlet of the swirling vane. That is, the equation (14) is obtained:

$$0 < x < x_2 \left(\frac{T}{T_0}\right). \quad (14)$$

In the equation (14), $T/T_0$ represents the torque attenuation rate at distance $x_2$ from the end of swirling vane 5a that faces opening end 6, and $x_2(T/T_0)$ represents distance $x_2$ from the end of swirling vane 5a that faces opening end 6 as a function of the above-described torque attenuation rate. That is, distance $x_2$, which is an upper limit of distance x shown in the above-described equation (14), is determined to satisfy the above-described equations (12) and (13) based on torque attenuation rate $T/T_0$. As shown in FIG. 1, the gas refrigerant containing oil flows into inflow pipe portion 1 from the upper part of inflow pipe portion 1 as shown by arrow 11. Thereafter, the gas refrigerant flows into swirling portion 5. In swirling portion 5, the gas refrigerant containing oil comes into collision with swirling vane 5a and the inner wall of inflow pipe portion 1, and the oil is thereby captured on the surface of swirling vane 5a and the like. The gas refrigerant is guided by swirling vane 5a to form a swirling flow. By the swirling flow, the oil captured on the surface of swirling vane 5a is transferred to the inner wall side of inflow pipe portion 1. In addition, the captured oil is guided to the wall surface of oil storage portion 4 by the flow of the gas refrigerant. Then, oil film 12 is formed on the inner wall of oil storage portion 4. Oil film 12 flows to oil return pipe portion 3 as shown by arrow 13. In contrast, the gas refrigerant having the oil separated therefrom in swirling portion 5 is discharged outside from swirling portion 5 through opening end 6 of outflow pipe portion 2 as shown by arrow 15.

As shown in the above-described equation (14), the outflow pipe end position of the refrigerant is determined based on the torque attenuation rate, and thus, the torque generated at swirling vane 5a can be used to the fullest extent. As a result, the unseparated oil included in the refrigerant flow forms the oil film on the inner surface of inflow pipe portion 1, and the oil is thereby separated from the refrigerant flow. When opening end 6, which is the outflow pipe end position, moves downward, an influence of re-scattering appears. Therefore, the position of opening end 6, which is the outflow pipe end position, is determined based on, for example, a torque attenuation rate position at which the oil separation efficiency is maximized.

Any method may be used as the method for determining the value of distance $x_2$. However, the value of distance $x_2$ may be determined by using, for example, the fact that the torque attenuation rate $(T/T_0)$ decreases exponentially. Herein, about 36.8%, which is a value when an argument of an exponential function is −1, is used as an indication of an amount of exponential attenuation. The value used as the indication is a reciprocal of the Napier's constant. The value of distance $x_2$ may be determined by using the above-described value as the indication. For example, a distance from the end of swirling vane 5a to a position at which the torque attenuation rate is about 36.8% is defined as the value of distance $x_2$. Furthermore, as to another condition, inner diameter d as a width of inflow pipe portion 1 is set at, for example, 17.5 mm, which is a realistic value when the separator is mounted on an air conditioner. In this case, the above-described value of distance $x_2$ is 37.5 mm. That is, a numerical range of distance x can be from 0 mm to 37.5 mm. The outflow pipe end position can be determined to satisfy the condition.

Second Embodiment

<Configuration of Separator>

Figure 6:
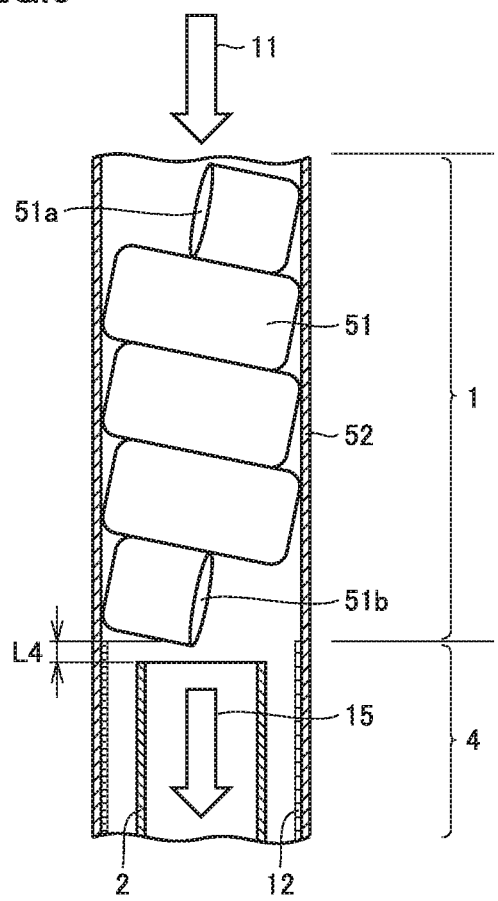
FIG. 6 is a schematic cross-sectional view showing a configuration example of a separator according to a second embodiment of the present invention.
Figure 7:
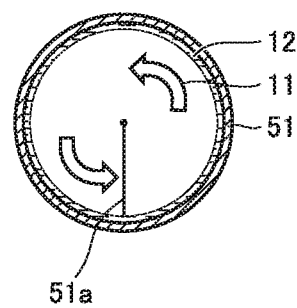
FIG. 7 is a schematic view showing the configuration example of the separator shown in FIG. 6.

FIG. 6 is a schematic cross-sectional view showing a configuration example of a separator according to a second embodiment of the present invention. FIG. 7 is a schematic view showing the configuration example of the separator shown in FIG. 6. The separator shown in FIGS. 6 and 7 is configured basically similarly to the separator shown in FIGS. 1 and 2. However, the separator shown in FIGS. 6 and 7 is different from the separator shown in FIGS. 1 and 2 in terms of a configuration of swirling portion 5 and a configuration of oil storage portion 4.

In the separator shown in FIGS. 6 and 7, the swirling portion includes a pipe 51 extending spirally with respect to an extending direction of inflow pipe portion 1. In addition, inflow pipe portion 1 includes a cylindrical portion 52 surrounding spirally extending pipe 51 and connected to oil storage portion 4. Oil storage portion 4 has substantially the same inner diameter as that of cylindrical portion 52 of inflow pipe portion 1. Oil storage portion 4 and cylindrical portion 52 of inflow pipe portion 1 are integrated and are formed by one pipe.

From a different perspective, the separator shown in FIGS. 6 and 7 includes an outer pipe having a straight pipe shape, pipe 51 that is a first inner pipe having a spiral shape, and outflow pipe portion 2 that is a second inner pipe having a straight pipe shape. The outer pipe corresponds to oil storage portion 4 and the cylindrical portion of inflow pipe portion 1.

A distance L4 between a lower part of spiral pipe 51 and outflow pipe portion 2 may be determined to fall within the numerical range similar to that of distance L1 shown in FIG. 2. Specifically, distance L4 may be set at a value included in the numerical range of x expressed by the above-described equation (1).

<Operation of Separator>

In the separator shown in FIGS. 6 and 7, when gas refrigerant containing oil flows into the outer pipe having a straight pipe shape as shown by an arrow 11 in FIG. 6, the gas refrigerant flows from a one end opening 51a into spiral pipe 51 that is the first inner pipe. In the process of the gas refrigerant flowing through pipe 51, the gas refrigerant flows spirally as shown by an arrow 11 in FIG. 7, and thus, the oil in the gas refrigerant receives the centrifugal force. As a result, the oil forms oil film 12 along a portion of an inner wall of pipe 51 that faces a radial direction of inflow pipe portion 1. Oil film 12 flows from the inside of pipe 51 through an other end opening 51b to an inner wall of the outer pipe having a straight pipe shape. Furthermore, oil film 12 flows to oil return pipe portion 3 along an inner wall of oil storage portion 4 that is the outer pipe. In contrast, the gas refrigerant having the oil separated therefrom is discharged outside through outflow pipe portion 2 that is the second inner pipe having a straight pipe shape, as shown by an arrow 15. In this way, the oil and the gas refrigerant are separated.

<Function and Effect>

In the above-described separator, swirling portion 5 includes pipe 51 extending spirally with respect to the extending direction of inflow pipe portion 1. In this case, spiral pipe 51 allows a flow of the gas refrigerant containing oil to form a swirling flow. Therefore, the oil in the gas refrigerant can adhere to the inner wall of pipe 51, and thus, the oil can be separated from the gas refrigerant.

In the above-described separator, inflow pipe portion 1 includes cylindrical portion 52 surrounding above-described spirally extending pipe 51 and connected to oil storage portion 4. Cylindrical portion 52 and oil storage portion 4 forms an integrated pipe. In this case, cylindrical portion 52 of inflow pipe portion 1 and oil storage portion 4 are formed by an integrated pipe, and thus, a configuration of the separator can be simplified and the separator can be reduced in size.

In the separator shown in FIGS. 6 and 7, the gas refrigerant flows through spiral pipe 51 and the gas refrigerant thereby obtains the swirling force. Therefore, the oil in the gas refrigerant adheres to the inner wall of pipe 51, particularly the inner wall located radially outside, and forms the oil film. Furthermore, the oil film flows out from other end opening 51b of spiral pipe 51, and then, the oil film flows to oil return pipe portion 3 along the inner wall of oil storage portion 4 that is the outer pipe. In contrast, the gas refrigerant discharged from pipe 51 flows through outflow pipe portion 2 as shown by arrow 15. As described above, oil storage portion 4 and outflow pipe portion 2 have a double pipe structure having a straight pipe shape, and thus, a region where the gas refrigerant flows and a region where the oil flows are spatially separated. In addition, distance L4 between pipe 51 and outflow pipe portion 2 is also set to be sufficiently small. As a result, a region where the gas refrigerant is blown onto the oil film decreases, and thus, an influence of re-scattering of the oil can be reduced. As a result, the oil separation efficiency can be improved.

Third Embodiment

<Configuration of Separator>

Figure 8:
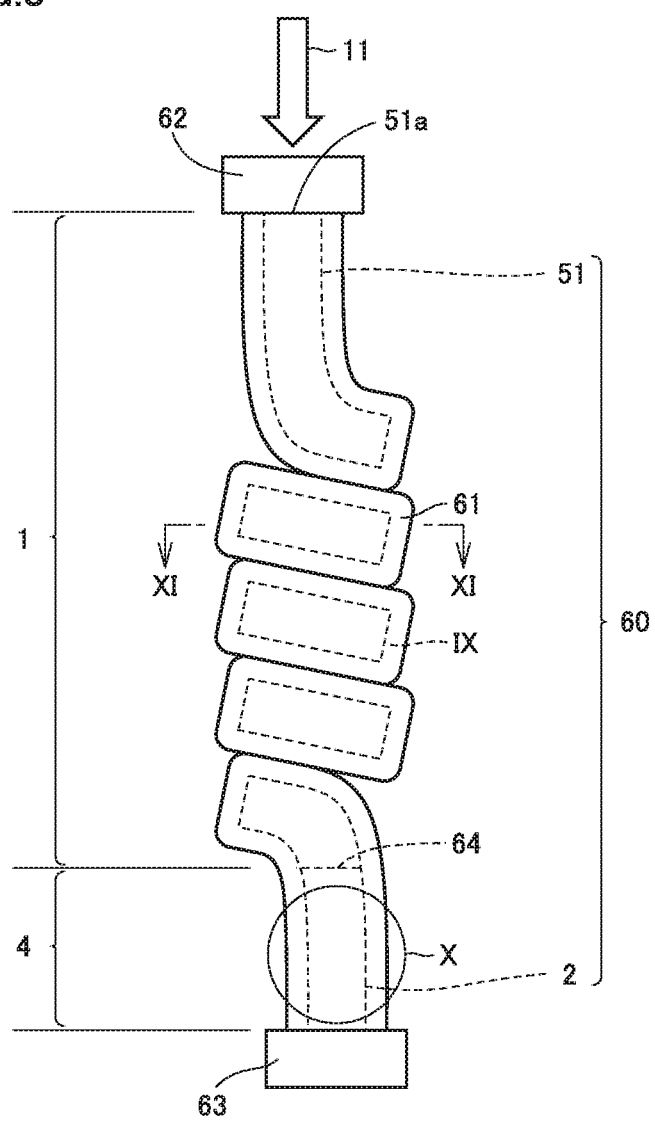
FIG. 8 is a schematic view showing a configuration example of a separator according to a third embodiment of the present invention.
Figure 9:
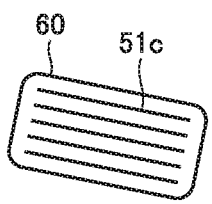
FIG. 9 is a schematic view for illustrating the configuration of the separator in a region IX in FIG. 8.
Figure 10:
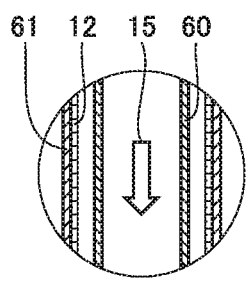
FIG. 10 is a schematic partial cross-sectional view in a region X in FIG. 8.
Figure 11:
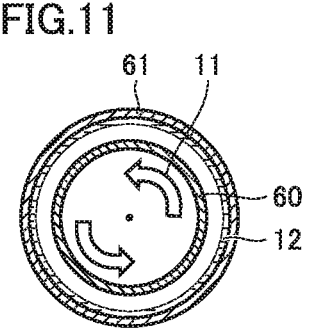
FIG. 11 is a schematic cross-sectional view taken along line XI-XI in FIG. 8.

FIG. 8 is a schematic view showing a configuration example of a separator according to a third embodiment of the present invention. FIG. 9 is a schematic view for illustrating the configuration of the separator in a region IX in FIG. 8. FIG. 10 is a schematic partial cross-sectional view in a region X in FIG. 8. FIG. 11 is a schematic cross-sectional view taken along line XI-XI in FIG. 8. The separator shown in FIGS. 8 to 11 is configured basically similarly to the separator shown in FIGS. 6 and 7. However, the separator shown in FIGS. 8 to 11 is different from the separator shown in FIGS. 6 and 7 in terms of a configuration of an outer circumferential side pipe 61 that is a part of inflow pipe portion 1, and a configuration of outflow pipe portion 2.

In the separator shown in FIGS. 8 to 11, an inlet-side opening of inflow pipe portion 1 into which refrigerant flows is one end opening 51a of spirally extending pipe 51. Spirally extending pipe 51 has slits 51c as through holes in a wall portion on the outer circumferential side. A plurality of slits 51c are formed. A shape of each through hole is not limited to the slit and may be any other shape such as a rectangular shape, a circular shape and an oval shape.

An end of spirally extending pipe 51 opposite to one end opening 51a is connected to the opening end of outflow pipe portion 2 at a connection portion 64, and spirally extending pipe 51 and outflow pipe portion 2 are thereby integrated. That is, pipe 51 and outflow pipe portion 2 are formed by one pipe 60. An outer circumferential pipe that surrounds pipe 51 in inflow pipe portion 1 and oil storage portion 4 are integrated pipe 61, surround spirally extending pipe 51 and outflow pipe portion 2, and have a spiral shape corresponding to spirally extending pipe 51. A coaxial double pipe is implemented by inner circumferential side pipe 60 and outer circumferential side pipe 61 that surrounds pipe 60 and forms the outer circumferential pipe of inflow pipe portion 1 and oil storage portion 4.

From a different perspective, in the above-described separator, spirally extending pipe 51 and outflow pipe portion 2 form integrated inner circumferential side pipe 60. The outer circumferential pipe of inflow pipe portion 1 and oil storage portion 4 form integrated outer circumferential side pipe 61. Inner circumferential side pipe 60 and outer circumferential side pipe 61 are arranged coaxially. Outer circumferential side pipe 61 and inner circumferential side pipe 60 may be connected on the one end opening 51a side through a fixing portion 62. Outer circumferential side pipe 61 and inner circumferential side pipe 60 may be connected on the opposite side of one end opening 51a through a fixing portion 63.

<Operation of Separator>

In the separator shown in FIG. 8, when gas refrigerant containing oil flows into pipe 60 from one end opening 51a (hereinafter, also referred to as "inlet-side opening") as shown by an arrow 11 in FIG. 8, the refrigerant flows through the spiral portion of pipe 60. As a result, the gas refrigerant flows spirally along pipe 60 as shown in FIG. 11, and thus, the oil in the gas refrigerant receives the centrifugal force. The oil that has received the centrifugal force adheres to an inner wall of pipe 60. The adhering oil reaches an inner wall of outer pipe 61 through slits 51c of pipe 60 and forms oil film 12 as shown in FIG. 10. Oil film 12 flows along the inner wall of pipe 61 and is discharged to oil return pipe portion 3 (not shown) through the portion of pipe 61 that forms oil storage portion 4. In contrast, the gas refrigerant flows through pipe 60 and is discharged outside through outflow pipe portion 2.

<Function and Effect>

In the above-described separator, spirally extending pipe 51 into which the gas refrigerant containing oil flows has slits 51c as through holes in the wall portion on the outer circumferential side. Therefore, a flow of the gas refrigerant that flows through spirally extending pipe 51 forms a swirling flow, and thus, the oil adhering to the inner wall of pipe 51 reaches the inner wall of outer pipe 61 through slits 51c. In this way, the oil can be separated from the gas refrigerant that flows through pipe 60. That is, a region where the gas refrigerant flows and a region where the oil flows are spatially separated, and thus, an influence of blowing of the refrigerant onto the oil film can be reduced. In addition, the oil re-scattered from the oil film is never included in the gas refrigerant again, unless the oil enters pipe 60 through slits 51c. Thus, it is possible to reduce the possibility that the re-scattered oil is included in the gas refrigerant.

Therefore, the oil separation efficiency can be improved.

Fourth Embodiment

<Configuration of Separator>

Figure 12:
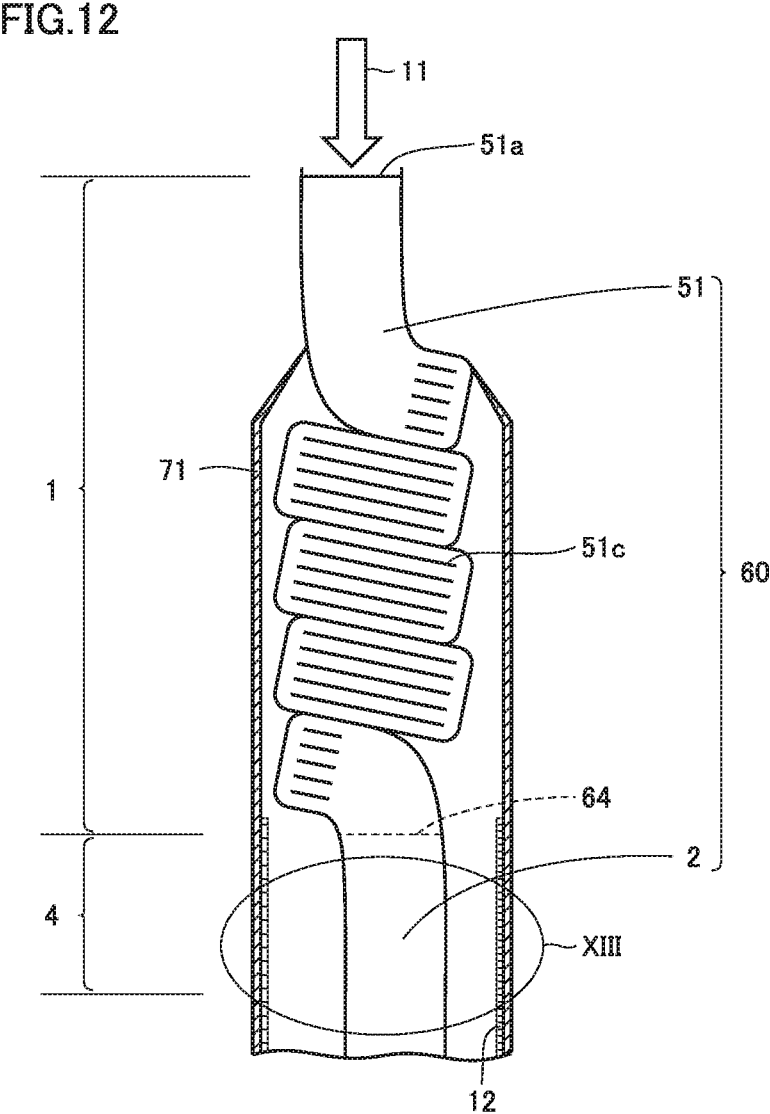
FIG. 12 is a schematic view showing a configuration example of a separator according to a fourth embodiment of the present invention.
Figure 13:
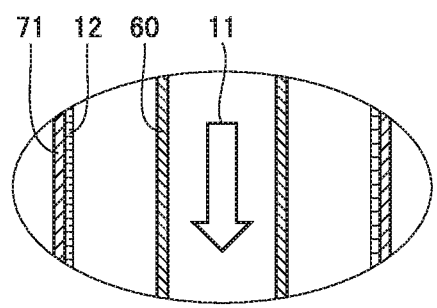
FIG. 13 is a schematic partial cross-sectional view in a region XIII in FIG. 12.

FIG. 12 is a schematic view showing a configuration example of a separator according to a fourth embodiment of the present invention. FIG. 13 is a schematic view for illustrating the configuration of the separator in a region XIII in FIG. 8. The separator shown in FIGS. 12 and 13 is configured basically similarly to the separator shown in FIGS. 8 to 11. However, the separator shown in FIGS. 12 and 13 is different from the separator shown in FIGS. 8 to 11 in terms of a configuration of a cylindrically-shaped portion 71 that is a pipe forming inflow pipe portion 1.

In the separator shown in FIGS. 12 and 13, an inlet-side opening of inflow pipe portion 1 into which refrigerant flows is one end opening 51a of spirally extending pipe 51. Spirally extending pipe 51, which is a part of inner circumferential side pipe 60, has a plurality of slits 51c as through holes in a wall portion on the outer circumferential side. An end of spirally extending pipe 51 opposite to one end opening 51a is connected to the opening end of outflow pipe portion 2 at connection portion 64, and spirally extending pipe 51 and outflow pipe portion 2 thereby form integrated pipe 60. Inflow pipe portion 1 includes cylindrically-shaped portion 71 arranged to surround a region of spirally extending pipe 51 where slits 51c as through holes are formed. Cylindrically-shaped portion 71 is connected to oil storage portion 4. Cylindrically-shaped portion 71 and oil storage portion 4 are an integrated outer circumferential pipe. An upper part of cylindrically-shaped portion 71 is a tapered portion having a width that becomes gradually smaller. An upper end of the tapered portion of cylindrically-shaped portion 71 having the smallest width is connected to a surface of pipe 51.

<Operation of Separator>

In the separator shown in FIGS. 12 and 13, when gas refrigerant containing oil flows into pipe 60 from inlet-side opening 51a as shown by an arrow 11 in FIG. 12, the refrigerant flows through the spiral portion of pipe 60. As a result, the gas refrigerant flows spirally along pipe 60, and thus, the oil in the gas refrigerant receives the centrifugal force. The oil that has received the centrifugal force adheres to an inner wall of pipe 60. The adhering oil reaches an inner wall of outer cylindrically-shaped portion 71 through slits 51c of pipe 60 and forms oil film 12 as shown in FIG. 13. Oil film 12 flows along the inner wall of cylindrically-shaped portion 71 and is discharged to oil return pipe portion 3 (not shown) through oil storage portion 4. In contrast, the gas refrigerant flows through pipe 60 and is discharged outside through outflow pipe portion 2.

<Function and Effect>

According to the above-described separator, the gas refrigerant flows through spiral pipe 51, and thus, the oil included in the gas refrigerant reaches the inner wall of cylindrically-shaped portion 71 that is an outer circumferential side pipe, and forms the oil film. In contrast, the gas refrigerant flows through inner circumferential side pipe 60 and is discharged outside through outflow pipe portion 2. In this way, a region where the gas refrigerant flows and a region where the oil flows are spatially separated, and thus, an influence of blowing of the refrigerant onto the oil film can be reduced similarly to the separator according to the third embodiment. In addition, the oil re-scattered from the oil film is never included in the gas refrigerant again, unless the oil enters pipe 60 through slits 51c. Thus, it is possible to reduce the possibility that the re-scattered oil is included in the gas refrigerant. Therefore, the oil separation efficiency can be improved.

Fifth Embodiment

<Configuration of Air Conditioner>

Figure 14:
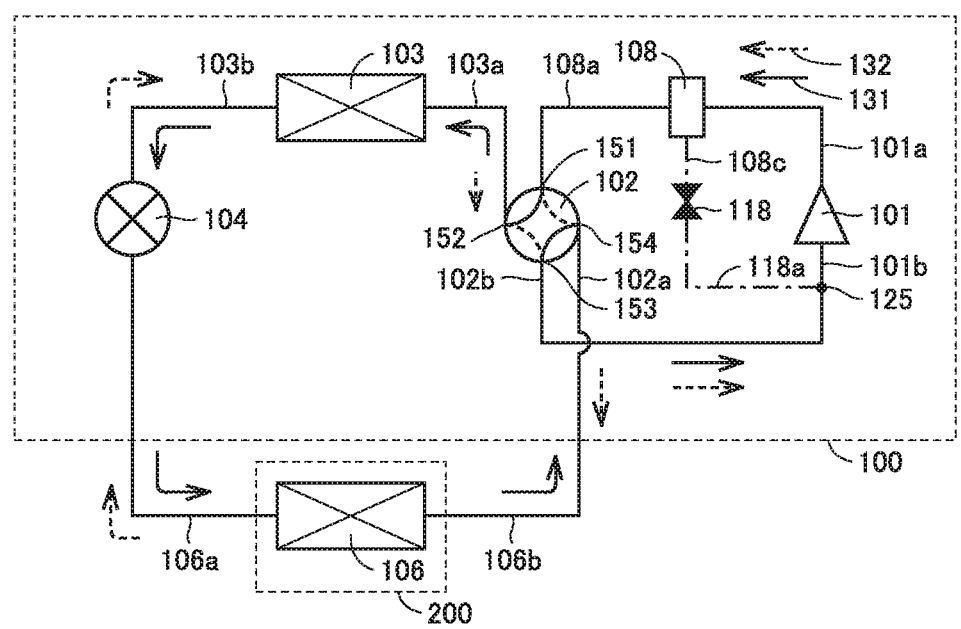
FIG. 14 is a schematic view showing a configuration example of a refrigeration cycle apparatus according to a fifth embodiment of the present invention.

FIG. 14 is a configuration diagram of an air conditioner as a refrigeration cycle apparatus according to a fifth embodiment of the present invention. A configuration of the air conditioner according to the present embodiment will be described below with reference to FIG. 14.

The air conditioner includes a refrigerant circuit through which refrigerant circulates. The refrigerant circuit mainly includes a compressor 101, an outdoor heat exchanger 103 as a first heat exchanger, an expansion valve 104, an indoor heat exchanger 106 as a second heat exchanger, a four-way valve 102 as a flow path switching apparatus, and a separator 108 for separating oil from the refrigerant. During cooling operation, for example, the refrigerant flows through the above-described refrigerant circuit in the order of compressor 101, separator 108, four-way valve 102, outdoor heat exchanger 103, expansion valve 104, indoor heat exchanger 106, and four-way valve 102 as shown by a solid arrow 131. During heating operation, for example, the refrigerant flows through the above-described refrigerant circuit in the order of compressor 101, separator 108, four-way valve 102, indoor heat exchanger 106, expansion valve 104, outdoor heat exchanger 103, and four-way valve 102 as shown by a dotted arrow 132.

Compressor 101 includes an inlet and an outlet. Four-way valve 102 includes a first port 151, a second port 152, a third port 153, and a fourth port 154. First port 151 is connected to the outlet of compressor 101 through separator 108. Second port 152 is connected to outdoor heat exchanger 103. Third port 153 is connected to the inlet of compressor 101. Fourth port 154 is connected to indoor heat exchanger 106 through pipes 102a and 106b. In four-way valve 102, first port 151 is configured such that a connection state is switchable between second port 152 and fourth port 154. Third port 153 is configured such that a connection state is switchable between second port 152 and fourth port 154.

A pipe 101a connects the outlet of compressor 101 to separator 108. A pipe 108a connects separator 108 to first port 151. A pipe 103a connects second port 152 to outdoor heat exchanger 103. Pipes 102b and 101b connect third port 153 to the inlet of compressor 101. Outdoor heat exchanger 103 is connected to expansion valve 104 through a pipe 103b. Expansion valve 104 is connected to indoor heat exchanger 106 through a pipe 106a.

The separator according to any one of the above-described first to fourth embodiments is used as above-described separator 108. Oil return pipe portion 3 of the separator according to any one of the above-described embodiments is connected to a pipe 108c. Inflow pipe portion 1 of the separator according to any one of the above-described embodiments is connected to pipe 101a, and outflow pipe portion 2 is connected to pipe 108a. Pipe 108c is connected to a valve 118. Valve 118 is connected to a connection portion 125 of pipe 101b through a pipe 118a. Oil separator 108 separates the refrigerator oil from the refrigerant introduced from compressor 101.

The air conditioner is composed of an indoor unit 200 including at least an indoor heat exchanger, and an outdoor unit 100 including at least compressor 101 and outdoor heat exchanger 103.

<Function and Effect>

The air conditioner that is one example of the refrigeration cycle apparatus according to the present disclosure includes the refrigerant circuit through which the refrigerant circulates, the refrigerant circuit including compressor 101, four-way valve 102 that is one example of the flow path switching apparatus, outdoor heat exchanger 103 that is one example of the first heat exchanger, expansion valve 104, and indoor heat exchanger 106 that is one example of the second heat exchanger. The air conditioner further includes separator 108 according to any one of the embodiments of the present invention placed in the refrigerant circuit.

With such a configuration, the air conditioner having high efficiency can be achieved by using the separator having excellent refrigerator oil separation efficiency.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 inflow pipe portion; 1a, 5c extending direction; 2 outflow pipe portion; 3 oil return pipe portion; 4 oil storage portion; 4a tapered portion; 4b main body portion; 5 swirling portion; 5a swirling vane; 5b end; 6 opening end; 7 lower part; 8, 64, 125 connection portion; 11, 13, 15, 131, 132 arrow; 12 oil film; 51, 60, 61, 101a, 101b, 102a, 102b, 103a, 103b, 106a, 108a, 108c, 118a pipe; 51a one end opening; 51b other end opening; 51c slit; 52 cylindrical portion; 62, 63 fixing portion; 71 cylindrically-shaped portion; 100 outdoor unit; 101 compressor; 102 four-way valve; 103 outdoor heat exchanger; 104 expansion valve; 106 indoor heat exchanger; 108 oil separator; 118 valve; 151 first port; 152 second port; 153 third port; 154 fourth port; 200 indoor unit.

The invention claimed is:

1. A separator that separates oil from refrigerant containing the oil, the separator comprising:
an inflow pipe portion into which the refrigerant is introduced, the inflow pipe portion including a swirling portion that defines a flow direction of the refrigerant so as to swirl the refrigerant;
an oil storage portion connected to the inflow pipe portion;
an oil return pipe portion connected to a vertically lower side of the oil storage portion; and
an outflow pipe portion including an opening end that faces the swirling portion, and extending from the opening end toward the oil return pipe portion, wherein
the swirling portion includes a swirling vane inclined spirally with respect to an extending direction of the inflow pipe portion,
the oil storage portion is provided to surround the outflow pipe portion, and includes: a tapered portion connected to the inflow pipe portion, and having a width that becomes gradually greater with increasing distance from the inflow pipe portion; and a main body portion connected to the tapered portion and having a cylindrical shape, and
a distance between the opening end of the outflow pipe portion and the swirling portion of the inflow pipe portion is smaller than a distance between the tapered portion and the swirling portion of the inflow pipe portion.

2. The separator according to claim 1, wherein
when β represents an angle formed by an extending direction at an end of the swirling vane that faces the opening end and the extending direction of the inflow pipe portion, and d represents a width of the inflow pipe portion, a distance between the opening end and the swirling portion is less than a value expressed by an equation of d/(2 tan β).

3. The separator according to claim 1, wherein
when $T_0$ represents torque of the refrigerant at an end of the swirling vane that faces the opening end, T represents torque at a distance $x_2$ from the end, d represents a width of the inflow pipe portion, $C_{fi}$ represents a friction coefficient of a gas-liquid interface, and k represents a constant, a distance x between the opening end and the swirling portion is less than the distance $x_2$, and
the distance $x_2$ is determined to satisfy following equations (1) and (2) based on a torque attenuation rate $T/T_0$:

$$T(x_2) = T_0 \, \exp\!\left(\frac{-4C_{fi}}{d} k x_2\right) \quad (1)$$

$$C_{fi} = 0.005\left\{1 + 300\left(\frac{h}{d}\right)\right\}. \quad (2)$$

4. A refrigeration cycle apparatus comprising:
a refrigerant circuit including a compressor, a flow path switching valve, a first heat exchanger, an expansion valve, and a second heat exchanger, and configured such that refrigerant circulates therein; and
the separator of claim 1, the separator being placed in the refrigerant circuit.

5. A separator that separates oil from refrigerant containing the oil, the separator comprising:
an inflow pipe portion into which the refrigerant is introduced;
a spirally extending pipe surrounded by the inflow pipe portion;
an oil storage portion connected to the inflow pipe portion;
and
an outflow pipe portion through which the refrigerant flowing through the spirally extending pipe flows, wherein
in the oil storage portion, a direction in which the oil separated from the refrigerant flowing through the spirally extending pipe flows is aligned with a direction in which the refrigerant flowing through the spirally extending pipe flows through the outflow pipe portion.

6. The separator according to claim 5, wherein
the inflow pipe portion is provided to surround the spirally extending pipe, and is integrated with the oil storage portion to form a cylindrical portion,
the oil storage portion is provided to surround the outflow pipe portion, and
the refrigerant flowing through the spirally extending pipe is discharged from an opening of the spirally extending pipe and flows to an opening of the outflow pipe portion.

7. The separator according to claim 5, wherein
an inlet-side opening of the inflow pipe portion into which the refrigerant flows is a one end opening of the spirally extending pipe,
the spirally extending pipe has a through hole in a wall portion on an outer circumferential side,
an end of the spirally extending pipe opposite to the one end opening is connected to the outflow pipe portion, and the spirally extending pipe and the outflow pipe portion are thereby integrated, and
the inflow pipe portion and the oil storage portion are an integrated pipe, and include an outer circumferential pipe that surrounds the spirally extending pipe and has a spiral shape corresponding to the spirally extending pipe.

8. The separator according to claim 5, wherein
an inlet-side opening of the inflow pipe portion into which the refrigerant flows is a one end opening of the spirally extending pipe,
the spirally extending pipe has a through hole in a wall portion on an outer circumferential side,
an end of the spirally extending pipe opposite to the one end opening is connected to the outflow pipe portion, and the spirally extending pipe and the outflow pipe portion are thereby integrated, and
the inflow pipe portion includes a cylindrically-shaped portion arranged to surround a region of the spirally extending pipe where the through hole is formed.

9. A refrigeration cycle apparatus comprising:
a refrigerant circuit including a compressor, a flow path switching valve, a first heat exchanger, an expansion valve, and a second heat exchanger, and configured such that refrigerant circulates therein; and
the separator of claim 5, the separator being placed in the refrigerant circuit.

* * * * *